Oct. 20, 1959 J. K. MOORE ET AL 2,909,680

CONDITIONAL STEERING GATE FOR A COMPLEMENTING FLIP FLOP

Filed March 29, 1957 2 Sheets-Sheet 1

INVENTORS
JAMES KENNETH MOORE
STANLEY SCHNEIDER
BY
ATTORNEY

Oct. 20, 1959 J. K. MOORE ET AL 2,909,680

CONDITIONAL STEERING GATE FOR A COMPLEMENTING FLIP FLOP

Filed March 29, 1957 2 Sheets-Sheet 2

INVENTORS
JAMES KENNETH. MOORE
STANLEY SCHNEIDER

BY J. Walter Schilpp

ATTORNEY 2,909,680
Patented Oct. 20, 1959

2,909,680

CONDITIONAL STEERING GATE FOR A COMPLEMENTING FLIP FLOP

James Kenneth Moore, Downingtown, and Stanley Schneider, Newtown Square, Pa., assignors to Burroughs Corporation, Detroit, Mich., a corporation of Michigan Application March 29, 1957, Serial No. 649,418
9 Claims. (Cl. 307—88.5)

Figure 1:
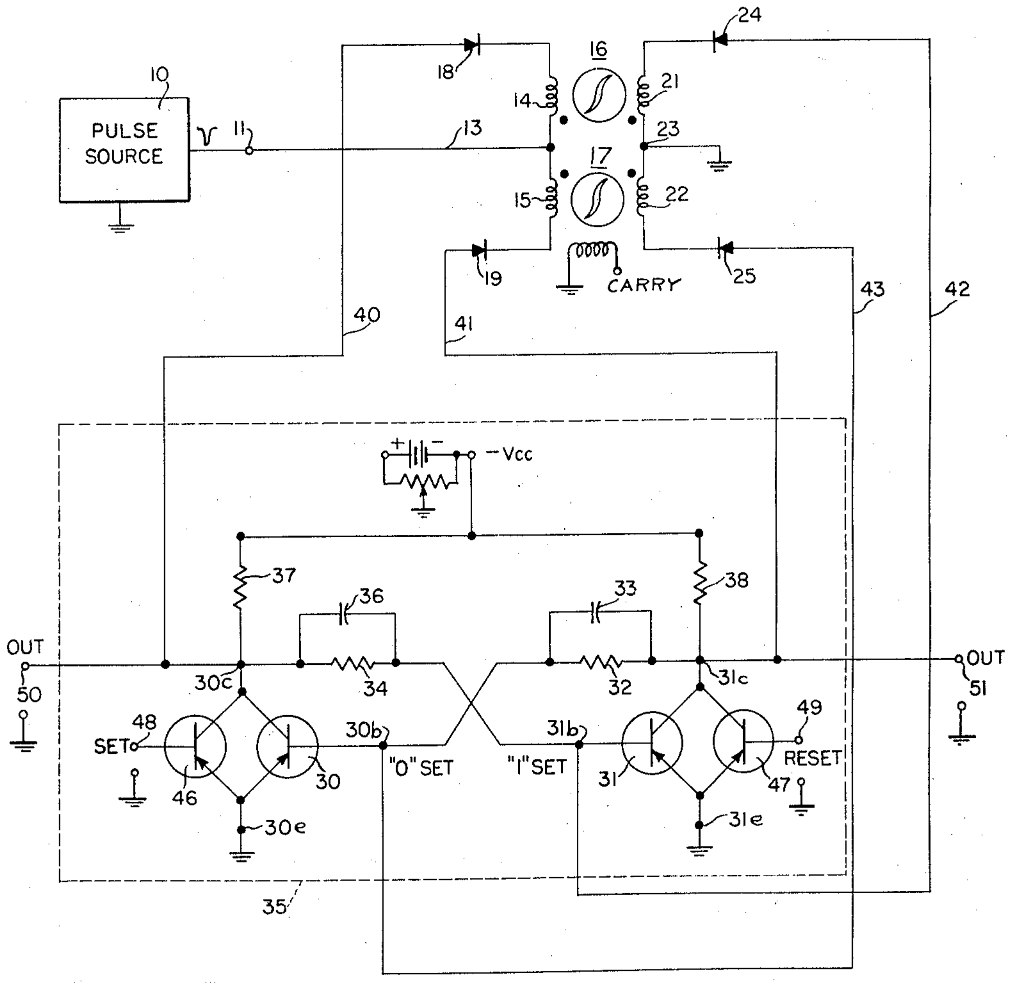

This invention relates to electronic steering gates and particularly to conditional steering gates for a high-speed complementing flip flop.

The gates of the present invention may also be used directly to provide the gating and logical delay necessary to connect a series of complementing flip flops together to form a shift register.

The gates of the present invention may also be used to perform the logic and to develop the logical delay necessary in accumulator type adders and multipliers.

In general, the circuit of the invention is useful in any of a large variety of computer and control applications where the control of pulses is desired and time race is to be avoided.

As is well known, a flip-flop circuit will remain in either one of its two stable states until caused to change to its other state by some external force, as by the application of a proper signal. Flip-flop circuits may be either non-complementing or complementing.

A non-complementing flip flop has two input terminals and will change its state in response to a pulse of given polarity applied to one, but not to the other, of its two input terminals; if such a pulse be applied to its other terminal, the flip flop will remain in its resident state.

A complementing flip flop, on the other hand, requires but a single input terminal and in response to a proper applied pulse will change to its other state irrespective of which one of its two states it was in at the time of the application of the pulse.

A non-complementing flip flop may be converted into a complementing flip flop by the addition of steering or inhibit gates which function to pass the externally applied pulse, or a signal derived therefrom, to that particular one of the two input terminals of the otherwise non-complementing flip-flop circuit which will cause the flip flop to change its state and to inhibit application of a signal to the other input terminal. For example, in one form of complementing flip flop, two gates are employed, one of which at any one time is "enabled" and the other of which is "disabled" according to the state of the flip flop. The gate which is connected to that one of the two input terminals of the flip flop per se, which in response to a signal will cause the flip flop to switch, is made enabled; the other is disabled. The externally applied pulse, which may be referred to as the input pulse, is applied to both gates but only the enabled gate passes a signal; the disabled gate inhibits passage of any signal. The signal passed by the enabled gate is effective, in the absence of a signal through the disabled gate, to change the flip flop to its other state.

In such a device as the above, some means must be provided which in response to the change of state of the flip flop, or in response to some subsequent event, is effective to reverse the status of the gates in anticipation of the arrival of the next input pulse; that is, some means must be provided to disable the enabled gate and to enable the disabled gate prior to the application of the next input pulse.

In those complementing flip flops wherein the status of the gate is reversed in response to the change of state of the flip flop, it will be seen that if the gates were permitted to reverse their status prior to the termination of the input pulse, the gate which was disabled at the start of the input pulse would now be enabled and in response to the continuing input pulse would pass a signal to the flip flop per se which would again change its state, i.e., would return the flip flop to the state it was in at the time the input pulse was first applied. Thus, the flip flop would continue to change state in an oscillatory manner as long as the input pulse were present and the final state of the flip flop would be a function of the duration of the input pulse. This action is known as time race.

While time race in a single flip flop may be prevented by the employment of delay lines or other means to delay the reversal of the gates for a fixed period of time following the change of state of the flip flop and then restricting the width of each input pulse to less than the chosen delay period, such a method becomes unsatisfactory where a number of flip flops are cascaded, as in a counter. Here, it becomes necessary to provide pulse standardizers between the stages or to provide the equivalent internal action limiting the effect of duration or more specifically the amplitude-time produce of the input pulses. Due to the design repetition frequency of a complementing flip flop of the ytpe above described is not as high as it could be were time race not a factor. Accordingly, such circuits are not as fast as is desired for some purposes.

Time race is avoided in some complementing flip-flop circuits by the employment of means which prevent the status of the gates from reversing until the input pulse is over. This action has been referred to as "conditional steering" since the respective status of the steering or inhibit gates is "conditional" upon the removal of the input pulse. The present invention relates to conditional steering.

It is an object of the present invention to provide, for a complementing flip-flop circuit, conditional steering means which effects reversal of the flip flop, and of the gates, at and only at the completion of the input pulse.

Another object is to provide, for a high-speed complementing flip flop, an improved form of conditional steering means which inhibits reversal of the flip flop, and of the gates, until the input pulse is completed, and which provides a signal which indicates the state to which the flip flop is being set.

Another object is to provide steering gates capable of being used directly to provide the gating and logical delay necessary to connect together a series of complementing flip flops to form a shift register.

Still another object is to provide a gate capable of performing the logic and to develop the logical delay necessary in accumulator type adders and multipliers.

These and other objects are accomplished, in a preferred embodiment, by a complementing flip flop circuit which includes, as the conditional steering means, a pair of pulse transformers having a diode in series with the primary winding of each transformer. Each of the diodes is biased by the D.-C. output level at one, but not the same, side of the flip flop, one diode being back biased and the other being zero biased, this situation reversing when the flip flop changes its state. A trigger input pulse is applied to the primary winding of each transformer. This pulse sees one winding as a high-impedance path and the other as a low-impedance path, according to whether the series diode included therein is back biased or zero biased, this of course being determined by the state of the flip flop. Current flows, therefore, through one primary winding but no appreciable current flows through the other. The flow of current through the one winding causes a flux change in the core of that transformer of which the winding is a part, and a voltage is induced in the secondary winding thereof. However, this induced voltage is not of the proper polarity to effect a change in the state of the flip flop and accordingly this voltage is either not applied to the flip flop or is applied but without any effect on the state thereof. Upon completion of the trigger input pulse, however, the decrease in primary current causes the flux in the transformer core to change in the opposite direction, and a "flyback" voltage is induced across the secondary winding whose polarity is opposite to that of the previously induced secondary voltage. This flyback voltage is applied across an input circuit of the flip flop and is effective to shift the flip flop to its other state.

It will be seen from the foregoing that the conditional steering-gate device of the present invention serves as a temporary storage medium which remembers the resident state of the flip flop for the duration of the trigger pulse and then, upon completion of the trigger pulse, delivers a signal to change the flip flop to its other state.

Where a signal is desired which corresponds, logically, to the "carry" output of a half-adder, this may be readily provided by means of an additional winding on the proper one of the two pulse transformers. Thus, the gate device of the invention is capable of performing the logic, and of providing the logical delay, necessary in accumulator type adders and multipliers.

Figure 2:
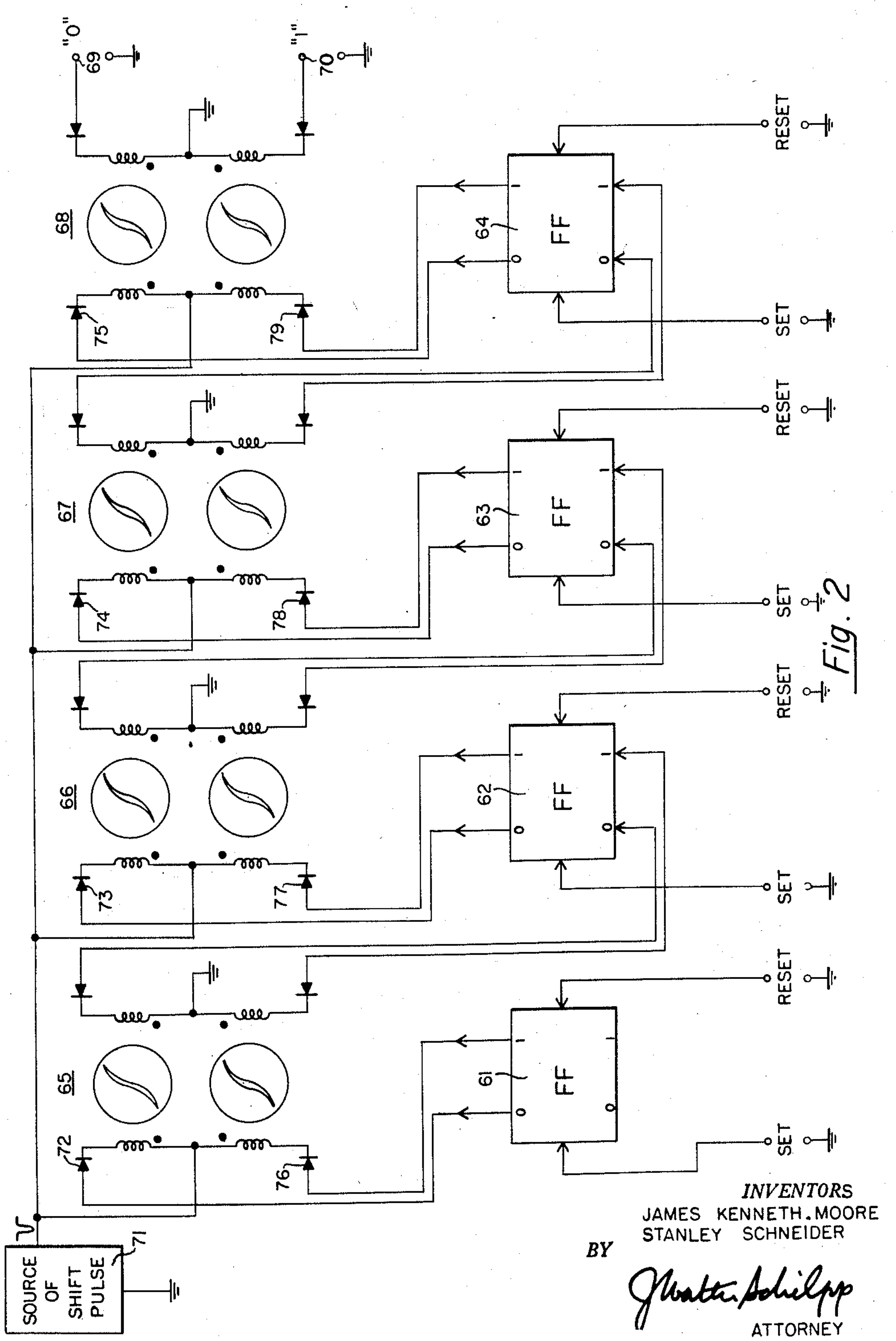

While the foregoing is a summary, the invention will be best understood from a detailed description of a preferred embodiment taken together with the drawing wherein:

Fig. 1 is a schematic of a complementing flip flop employing the conditional steering gates of the present invention; and Fig. 2 shows the conditional steering gates of the invention used to connect together a series of complementing flip flops to form a shift register.

Referring now to Fig. 1, there is shown a source 10 of negative trigger pulses connected to the input terminal 11 of the conditionally-steered complementing flip-flop circuit of the present invention. Reference numerals 16 and 17 represent pulse transformers whose primary windings 14 and 15 have one end connected together at a common junction to which the input terminal 11 is connected by a lead 13.

Diodes 18 and 19 are connected in series with the primary windings 14 and 15, respectively; the outer end of winding 14 is connected to the cathode of the diode 18 and the outer end of winding 15 is connected to the cathode of the diode 19.

The secondary windings 21 and 22 of the pulse transformers 16 and 17 have one end connected together at a point 23, which is grounded. Diodes 24 and 25 are connected in series with the secondary windings 21 and 22, respectively; the outer end of winding 21 is connected to the cathode of the diode 24 and the outer end of the winding 22 is connected to the cathode of the diode 25.

The flip flop per se is shown within the dotted rectangle 35. While the flip flop may take any one of a number of different forms, the particular flip-flop circuit shown in the drawing comprises the interconnected transistors 30 and 31, each of which is shown to be a PNP transistor, preferably of the alloy junction type. The base **30*b* of transistor 30 is connected to the collector 31*c* of transistor 31 through the R-C network comprising the resistor 32 and the shunt capacitor 33; and the base 31*b* of transistor 31 is connected to the collector 30*c* of transistor 30 through the R-C network comprising the resistor 34 and the shunt capacitor 36. The collector 30*c* of transistor 30 is connected to a source of negative D.-C. potential $-V_{cc}$ through a resistor 37; and the collector 31*c* of transistor 31 is connected to the same source of negative D.-C. voltage $-V_{cc}$ through the resistor 30. The emitters 30*e* and 31*e*** of the transistors are grounded.

The flip flop 35 also includes the transistors 46 and 47, these transistors being shunted across the flip flop transistors 30 and 31, respectively, in the manner shown in the drawing. The base of transistor 46 is connected to a terminal 48 marked "set" while the base of transistor 47 is connected to a terminal 49 marked "reset."

Output signals from flip flop 35 are available at, and if desired may be obtained from, terminals 50 and 51.

A lead 40 connects the collector **30*c* of transistor 30 to the anode of diode 18; and a lead 41 connects the collector 31*c* of transistor 31 to the anode of diode 19. The base 31*b* of transistor 31 is connected by lead 42 to the anode of diode 24 and the base 30*b* of transistor 30 is connected by lead 43 to the anode of diode 25. Pulse transformer 17 also includes a third winding 45** connected between ground and an output terminal marked "Carry."

The operation of the circuit of Fig. 1 will now be described. Assume that a negative pulse has been applied to the "set" terminal 48 to place the flip flop 35 is in that one of its two stable states, which may be designated arbitrarily as the "0" state, wherein transistor 31 is "off" and transistor 30 is "on" and bottomed, i.e., conducting at saturation. The potential at the collector of the bottomed transistor 30 is substantially equal to that at the emitter since the collector-to-emitter impedance is but a few ohms. With the emitter **30*e* grounded, the potential at the collector 30*c*, when the transistor 30 is bottomed, may actually be of the order of −0.1 volt, but this is negligible and for the purposes of the present discussion it will be assumed that the potential at the collector of a bottomed transistor is equal to that at the emitter. Thus, the collector 30*c* of the bottomed transistor 30 is assumed to be at ground potential. The collector 31*c*, however, of the "off" transistor 31 is at a negative potential $-V_c$; this potential is somewhat less negative than the source voltage $-V_{cc}$ due to the fact that there is some small value of base current and some leakage current flowing through the resistor 38**.

Assume that, with the flip flop 35 in the "0" state just described, there is applied from the source 10 to the input terminal 11 a negative trigger pulse whose peak amplitude is less negative than the potential $-V_c$ at the collector terminal **31*c*. Such a pulse sees the path which comprises the winding 15, the diode 19, and the flip-flop circuit between the collector 31*c* and ground, as a very high-impedance path due to the fact that the diode 19 is reverse biased by the negative voltage $-V_c$ at the collector 31*c*. However, the pulse sees the path which comprises the winding 14, the diode 18 and the bottomed transistor 30 as a very low-impedance path, since the diode 18 is zero biased by the ground potential at the collector 30*c* of transistor 30 and the trigger input pulse sets the diode 18 in its low-impedance state. Thus, the pulse will drive current through the winding 14 but no appreciable current will flow through winding 15**.

The flow of conventional current through winding 14 will be into the non-dotted end of the winding; and with the primary and secondary windings of the transformers having the polarities indicated in the drawing by the dots, the voltage induced in secondary winding 21 by the flux change in the core of transformer 16 resulting from the rise of current in primary winding 14 will be of a polarity to drive current out of the non-dotted end of the secondary winding 21. This voltage is positive and even if diode 24 were omitted, the application of such positive voltage by way of lead 42 to the base **31*b* of the "off" transistor 31 (designated in the drawing as the "1" set terminal) will not turn the transistor 31 "on," at least not ordinarily. The insertion of diode 24 in series with the winding 21 may, however, be desirable in a practical circuit in order to minimize any possible adverse effects which might result from the application of a positive pulse to the "1" set terminal. Moreover, in the particular circuit shown in Fig. 1, the diodes 24 and 25 are necessary in order to avoid having the windings 21 and 22 provide low-impedance D.-C. shunts across the base-emitter junctions of transistors 30 and 31**, respectively, which would prevent the negative D.-C. voltage source $-V_{cc}$ from maintaining an adequate forward bias on the base-emitter junction of the "on" transistor.

When the negative trigger input pulse from source 10 terminates, the magnetic field of pulse transformer 16 collapses and a flyback voltage is induced across the secondary winding 21 which is opposite in polarity to that induced when the current through winding 14 was increasing. This flyback voltage is negative and is of a polarity to drive current into the non-dotted end of the secondary winding 21. Since diode 24 is poled to offer very low impedance to current flow in this direction, an appreciable current flows. While the voltage drop across diode 24 may be of approximately the same magnitude as that across the base-emitter junction of transistor 31, the amount of flyback voltage which is applied to the "1" set terminal of the flip-flop circuit is adequate to forward bias the base-emitter junction of the transistor 31. Transistor 31 turns "on," collector current flows, its collector potential rises to ground, the forward bias on the base-emitter junction of transistor 30 is removed, and transistor 30 cuts off.

Thus, in response to the flyback voltage developed at the completion of the input trigger pulse and applied to the "1" set terminal, the flip flop 35 is caused to change its state from its resident state, the "0" state, to its other state, the "1" state.

Assume now that with the flip flop 35 in the "1" state, in which transistor 31 is "on" and transistor 30 is "off," a second negative trigger input pulse is applied from source 10 to the input terminal 11. With the flip flop 35 in the "1" state, the collector 30*c* of the "off" transistor 30 is at the negative potential $-V_c$ while the collector 31*c* of the bottomed transistor 31 is at ground potential. Thus, the diode 18 is back biased while the diode 19 is zero biased. Consequently, the negative trigger input pulse applied at this time finds the path which includes the primary winding 14 and the diode 18 to present a very high impedance but sees the path which includes the primary winding 15 and the diode 19 as a very low impedance. Accordingly, the pulse drives current through the primary winding 15, but no appreciable current flows through the primary winding 14.

The rise of current through the winding 15 causes a flux change in the core of the transformer 17 which induces a voltage in the secondary winding 22 which is of a polarity to drive current out of the non-dotted end of the winding 22. This voltage is positive and even if diode 25 were omitted the application of such positive voltage by way of lead 43 to the "0" set terminal of flip flop 35 would not change the state of the flip flop, since such a voltage is of a polarity to turn transistor 30 "off" and this transistor is already "off." Where, as in the circuit of Fig. 1, diode 25 is included, the diode will prevent current flow out of the non-dotted end of winding 22 since diode 25 is poled to present very high impedance to current flow in this direction.

At the termination of the second applied negative trigger pulse, the magnetic field of the pulse transformer 17 collapses and a flyback voltage is induced across the secondary winding 22 which is of a polarity to drive current into the non-dotted end of the winding. This voltage is negative and sets the diode 25, if used, in its low-impedance state. Thus, appreciable current flows. A portion of the flyback voltage is dropped across diode 25 but the remaining portion is applied, by way of lead 43, to the "0" set terminal of flip flop 35, and is adequate to forward bias the base-emitter junction of the "off" transistor 30. Thus, transistor 30 turns "on." When transistor 30 turns "on," transistor 31 is turned "off" in a manner similar to that previously described with respect to the turning "off" of transistor 30. Thus, the flip flop is caused to change its state from the "1" state to the "0" state.

It will be seen from the foregoing description of the operation of the circuit that the present invention provides a diode-transformer conditional steering gate device which delivers the trigger input pulse to one of two available input circuits of the flip flop and inhibits delivery of the input pulse to the other input circuit. Moreover, the input pulse is delivered to that one of the two input terminals which, in the absence of an input pulse to the other, causes the flip flop to change its state.

It is to be understood that the diode-transformer conditional steering-gate circuit of the present invention is not limited to being used with the transistor form of flip flop shown in the drawing and described above, and that any other suitable design of bistable circuit may be used, including a vacuum-tube form of flip flop. However, for fast operation the transistor flip flop is preferred. As an indication of the speed at which the transistor flip flop may be operated as a complementing flip flop conditionally steered by the diode-transformer gating device of the present invention, it may be stated that such a circuit has been used to count trigger pulses arriving at the rate of 12.8 megacycles per second.

While the transistor-flip flop shown in the drawing employs PNP transistors, it is to be understood that NPN junction transistors may be used, if desired. In that case, the polarities of the source voltage and of the trigger input pulse should be the reverse of those used in the circuit of Fig. 1 of the drawing.

In addition to its function as a conditional steering-gate device, the diode-transformer gate of the present invention is also capable of generating a signal which indicates the state to which the flip flop is being set; this signal is actually available before the flip flop has been triggered toward its new state. Such a pulse may be readily used as a fast "carry" pulse, as will now be described.

Assume that the circuit shown in Fig. 1 and described thus far is to be used as part of a digital computer and that the flip flop 35 is to serve an accumulator function in a system wherein the application of a trigger input pulse represents a binary "1" to be added to the accumulator and the absence of a trigger pulse represents the binary "0". In such case, if the flip flop is in its "0" state at the time of the application of the binary "1" pulse, the flip flop will be changed to its "1" state and no "carry" pulse need be derived. However, if at the time of the application of the binary "1" input pulse the flip flop is in its "1" state, the change of the flip flop to its "0" state will represent but a partial sum, and for full addition it will be necessary to develop a "carry" signal.

Such a "carry" signal is readily derived in the device of the present invention by adding to that transformer whose secondary supplies the pulse to the "0" set terminal of the flip flop (in the present case, transformer 17) a third winding 45 so that in response to the application of a trigger input pulse when the flip flop is in the "1" state, the rise of current through the primary winding 15 will induce in the third winding 45 a voltage which is available as a "carry" signal. Note that this signal is developed in response to the rise of current in the primary winding resulting from the leading edge of the trigger pulse. And, while the "carry" pulse lags behind the input pulse by a small amount due to the delay inherent in the transformer, this delay, which is primarily a function of the load impedance and leakage flux of the transformer, may be readily made as low as 0.02 microseconds and, with proper design, much lower. Thus, the "carry" signal is available before the flip flop has been triggered toward its new state, and it represents an extremely fast propagation of a "carry" digit.

It should also be pointed out that the use of the transformer as an integral part of the gate allows the designer to use the other transformer features to advantage. For example, the impedance level of the flip flop may be matched to that of the input trigger circuit by properly choosing the secondary winding. It is to be noted that the problem of impedance match is not simply one of turns ratio since the output pulse is delivered after the input pulse is completed. Another example of the advantage of the transformer is that it is possible to isolate the ground side of the transformer secondary and thus introduce the trigger pulses to the flip flop at points not possible with other types of coupling.

In some instances, as where the input signal source 10 is a D.-C. signal instead of a trigger pulse, it is advisable to include a current-limiting series resistor in lead 13 in order to avoid driving too much current through the "on" transistor; if the transistor current be excessive, the collector-to-emitter impedance will increase, the collector potential will fall, the "off" transistor will tend to turn "on", and the flip flop will tend to oscillate.

As indicated hereinbefore, the conditional steering gate of the present invention may be used directly to provide the gating and logical delay necessary to connect together a series of complementing flip flops to form a shift register. An example of such use is shown in Fig. 2.

Referring now to Fig. 2 there is shown a shift register comprising the four flip flops 61, 62, 63 and 64 and the four diode-transformer conditional steering gates 65, 66, 67 and 68.

In addition to the "0" and "1" input terminals, each of the flip flops is shown as having "set" and "reset" terminals to which data or clearance signals may be applied, thereby to place each of the flip flops in either the "0" or "1" state, as desired.

A source 71 of shift pulses is connected to the common junction of the primary windings of each pair of pulse transformers. The common junction of the secondary windings of each pulse transformer is connected to ground.

The manner in which the circuit of Fig. 2 operates will now be briefly described.

Assume that data signals representing the decimal number 9 in binary form (i.e. 1001) have been applied in parallel to the "set" and "reset" terminals of the four flip flops to place the first and fourth flip flops 61 and 64 in the "1" state and to place the second and third flip flops 62 and 63 in the "0" state. While the flip flops may take any one of a number of different forms, it will be convenient to assume that the flip flops 61 to 64 are similar to the flip flop 35 shown in detail in Fig. 1. It will then be clear from the description previously given of the operation of the circuit of Fig. 1 that with the first and fourth flip flops 61 and 64 each in the "1" state, the diode 72 in series with the upper primary winding of gate 65, and the diode 75 in series with the upper primary winding of gate 68, will each be back biased, while the diodes 76 and 79 in series with the lower windings of these gates will be zero biased. The situation with respect to the other two flip flops (62 and 63) which are in the "0" state will be the reverse of that just described, that is, the diodes 77 and 78 in series with the lower primary windings of gates 66 and 67 will be back biased while the diodes 73 and 74 in series with the upper primary windings of these gates will be zero biased.

It will be seen, then, that with the register in the condition just described, if a negative shift pulse from source 71 be applied, the pulse will drive current through the lower primary windings of gates 65 and 68 and through the upper primary windings of gates 66 and 67. The current flow through these primary windings will induce a voltage in the secondary winding of each of the corresponding pulse transformers, upper or lower as the case may be, but no secondary current will flow in any of these secondary circuits since the voltages induced are of a polarity to drive conventional current out of the non-dotted ends of these secondary windings and the diodes in series therewith are poled to prevent current flow in this direction.

At the termination of the shift pulse, however, the magnetic fields which had been established by the flow of primary current in the lower pulse transformers of gates 65 and 68, and in the upper pulse transformers of gates 66 and 67, collapse and a flyback voltage is induced in the secondary winding of each of these transformers of a polarity to drive current into the non-dotted ends of these secondary windings; and since the series diodes are poled to present low impedance to current flow in this direction, such current flow will occur.

In the particular circuitry shown in Fig. 2, and also in the particular detailed circuitry shown in Fig. 1, the flyback voltage is of negative polarity and when applied to the appropriate input terminals of the flip flop (the appropriate terminal may be either the "1" set terminal of the "0" set terminal according to the state of the flip flop) is effective to turn "on" the transistor which is "off," with the result that the transistor which had been "on" turns "off." Thus, the application of the flyback voltage to the appropriate input terminal of a flip flop is effective to cause the flip flop to change its state. This will be clear from the detailed circuit shown in Fig. 1.

It has just been shown that in the system of Fig. 2, with the flip flops in the states assumed above, a negative flyback voltage is induced in the secondary windings of the lower pulse transformers of gates 65 and 68 and in the secondary windings of the upper pulse transformers of gates 66 and 67. In the case of gate 65, the flyback voltage induced in the secondary winding of the lower transformer is seen to be applied to the "1" input terminal of flip flop 62, while in the case of gates 66 and 67 the flyback voltage induced in the secondary windings of the upper transformers are seen to be applied to the "0" input terminals of the flip flops 63 and 64. Thus, the flip flop 62 is shifted from the "0" to the "1" state, the flip flop 63 is held in the "0" state, and the flip flop 64 is shifted from the "1" to the "0" state. In the case of gate 68, the signal as developed by the flyback voltage appears at the "1" output terminal 70. Thus, the decimal number 9 which was in the register in binary form (1001) at the time of the application of the shift pulse has been shifted one place to the right.

It will be seen from the foregoing description of the shift register of Fig. 2, that the conditional steering gates of the present invention are readily usable to provide not only the gating but also the logical delay necessary to connect a series of flip flops together as a shift register.

What is claimed is:

1. A high-speed electronic gate comprising: first and second pulse transformers each having primary and secondary windings; means for connecting one end of each primary winding to a common junction; a first diode one electrode of which is connected to the other end of the primary of said first transformer; a second diode one electrode of which is connected to the other end of the primary of said second transformer, said one electrode of said first diode being similar to said one electrode of said second diode; a flip-flop circuit having a first output circuit terminal, a first input circuit terminal and a terminal common to said output and input circuits on one side of said flip flop and a second output circuit terminal, a second input circuit terminal and a terminal common to said output and input circuits on the other side of said flip flop; means connecting said first output circuit terminal to the other electrode of said first diode and said second output circuit terminal to the other electrode of said second diode to reverse bias said first diode when said flip flop is in one of its two bistable states and to reverse bias said second diode when the flip flop is in its other state; means for applying a trigger voltage pulse between said common junction of the primary windings of said first and second transformers and said common terminal of said flip flop to drive current through the primary winding of the transformer other than the one whose series diode is reverse biased at the time of application of the pulse, thereby to induce in the secondary winding of said current-carrying transformer an output signal of one polarity in response to the leading edge of the applied trigger pulse and an output signal of opposite polarity in response to the trailing edge of said applied trigger pulse; means for connecting one end of each secondary winding to a common junction; means for connecting the other end of the secondary winding of said first transformer to said second input circuit terminal and means for connecting the other end of the secondary winding of said second transformer to said first input circuit terminal to change the state of said flip flop in response to the ouput signal of opposite polarity induced in said secondary winding in response to the trailing edge of said applied trigger pulse, said output signal of one polarity induced in said secondary in response to the leading edge of said applied trigger pulse being ineffective to shift the flip flop, whereby said flip flop is reversed in response to the trailing edge of each successive applied trigger pulse.

2. A conditional steering gate for a complementing flip flop, said flip flop having two output circuit terminals, two input circuit terminals and two terminals common to said input and output circuits, one of each of said terminals being on each side of said flip flop, the voltage level at each said output circuit terminal varying between a high value and a low value as said flip flop changes its state, the voltage level at the output circuit terminal on one side being at its high value when the voltage level at the output circuit terminal on the other side is at its low value, said steering gate comprising: first and second pulse transformers each having primary and secondary windings; means connecting one end of the primary winding of each transformer directly to a common junction; a first diode connecting the other end of the primary winding of said first transformer to the output circuit terminal on said one side of said flip flop; a second diode connecting the other end of the primary winding of said second transformer to the output circuit terminal on said other side of said flip flop, said first and second diodes being similarly poled relative to said other end of their respective primary windings, one of said diodes being reversed biased and the other being forward biased according to the state of said flip flop; means connecting one end of the secondary winding of each transformer to a common point; means connecting the other end of the secondary winding of said first transformer to the input circuit terminal on said other side of said flip flop; means connecting the other end of the secondary winding of said second transformer to the input circuit terminal on said one side of said flip flop; and means for connecting a source of trigger voltage pulse between said common junction of said primary windings and said common terminal of said flip flop, thereby, in response to the application of a trigger pulse, and according to the bias on the respective diodes as determined by the state of the flip flop, to drive current through the primary winding of one transformer but not through the primary winding of the other, and thereby to induce a voltage in the secondary winding of that transformer whose primary winding carries said current, the voltage so induced in said secondary in response to the leading edge of said applied pulse being of a polarity to be ineffective to change the state of said flip flop but the voltage so induced in said secondary in response to the trailing edge of said pulse being of a polarity to be effective to shift the state of said flip flop.

3. In combination: first and second pulse transformers each having primary and secondary windings; means for connecting one end of each primary winding to a common junction; first and second series diodes each having a similar electrode connected to the other end of a different one of said primary windings; a flip-flop circuit having two output circuit terminals, two input circuit terminals and two terminals common to both said input and output circuits, one of each of said terminals being on each side of said flip flop, the voltage at each output circuit terminal varying between two levels as the flip flop changes its state, the voltage at the output circuit terminal on one side of said flip flop being at its upper level when the voltage at the output circuit terminal on the other side is at its lower level; means connecting the output circuit terminal on one side of said flip flop to the other electrode of one of said diodes and the output circuit terminal on the other side of said flip flop to the other electrode of the other of said diodes, thereby to back-bias said one diode when said flip flop is in one of its states and to back-bias said other diode when the flip flop is in its other state; means for applying a trigger pulse between said common junction of the primary windings of both transformers and said common terminals of said flip flop to drive current through the primary winding of the transformer other than the one whose series diode is reverse biased and to induce in the secondary winding of said current-carrying transformer an output signal of one polarity in response to the leading edge of the applied trigger pulse and an output signal of opposite polarity in response to the trailing edge of the applied trigger pulse; means connecting the secondary winding of that transformer whose primary winding is in series with said one diode to the input circuit terminal on said other side of said flip flop; and means connecting the secondary winding of the other transformer to the input circuit terminal on said one side of said flip flop, whereby said secondary output signal of said one polarity is ineffective to change the state of said flip flop but said secondary output signal of opposite polarity is effective to cause the flip flop to shift from one state to the other.

4. A conditional steering gate for a complementing flip flop, said flip flop having two output circuits and two input circuits, one of each on each side of said flip flop, said steering gate comprising: a first current path comprising, connected in series, the primary winding of a first transformer, a first diode and the output circuit on one side of said flip flop; a second current path comprising, connected in series, the primary winding of a second transformer, a second diode, and the output circuit on the other side of said flip flop, said diodes being similarly poled relative to their respective primary winding; means connecting the secondary winding of said first transformer in shunt across the input circuit on the other side of said flip flop; means connecting the secondary winding of said second transformer in shunt across the input circuit on said one side of said flip flop; and means for applying a trigger voltage pulse across said first current path and across said second current path in parallel to drive current through the primary winding of one transformer but not through the primary winding of the other, according to the state of the flip flop, thereby to induce a voltage of one polarity in the secondary winding of one transformer in response to the leading edge of the trigger pulse and a flyback voltage of opposite polarity in the secondary winding of the same transformer in response to the trailing edge of said trigger pulse, said flyback voltage being of a polarity and magnitude effective to shift the state of the flip flop.

5. In combination: first and second flip flop circuits each having two output terminals, two input terminals and a common reference terminal, one of each of each side of each said flip flop, the voltage level at each output terminal varying between a high value and a low value as its flip flop changes its state, the voltage level at the output terminal on one side being at its high value when the voltage level at the output terminal on the other side is at its low value; a first pulse transformer having primary and secondary windings; a second pulse transformer having primary and secondary windings; means connecting one end of the primary winding of each transformer directly to a common junction; a first diode connecting the other end of the primary winding of said first transformer to the output terminal on one side of said first flip flop and a second diode connecting the other end of the primary winding of said second transformer to the output terminal on the other side of said first flip flop, said diodes being similarly poled relative to their respective transformer windings, whereby one of said diodes is back biased and the other is not, according to the state of said first flip flop; means connecting one end of the secondary winding of each transformer to a common point; a third diode connecting the other end of the secondary winding of said first transformer to a first-transformer output terminal; a fourth diode connecting the other end of the secondary winding of said second transformer to a second-transformer output terminal, said third and fourth diodes being similarly poled relative to their respective transformer secondary windings; means connecting a source of trigger voltage pulse between said common junction of said primary windings and said common reference terminal of said first flip flop, thereby, in response to the application of a trigger pulse, and according to the state of said first flip flop, to drive current through the primary winding of one transformer but not through the primary winding of the other and thereby to induce a voltage in the secondary winding of that transformer whose primary winding carries said current, said third and fourth diodes being poled to prevent current flow in said secondary winding in response to the voltage induced in said secondary winding by the leading edge of the applied pulse but poled for easy secondary current flow in response to the voltage induced by the trailing edge of the applied pulse; and means connected to the output terminals of said first and second transformers for applying the voltage induced in said secondary winding by said trailing edge of said applied pulse to an input terminal of said second flip-flop circuit to change the state thereof.

6. In combination: first and second transformers; first and second diodes; a flip flop comprising two inter-connected transistors and a source of bias voltage; means for connecting a voltage pulse source across first and second parallel current paths, said first current path comprising in series connection the primary winding of said first transformer, said first diode, and the impedance between the output terminals of the transistor on one side of said flip flop, said second current path comprising in series connection the primary winding of said second transformer, said second diode, and the impedance between the output terminals of the transistor on the other side of said flip flop, one of said diodes being reversed biased and the other being zero biased, according to the state of the flip flop, by the voltage appearing between the output terminals of the respective flip-flop transistor, thereby in response to a voltage pulse from said source to drive current through one only of said first and second current paths; a third diode connected in series with the secondary winding of said first pulse transformer; a fourth diode connected in series with the secondary winding of said second pulse transformer, said third and fourth diodes being poled to offer high impedance to current flow in the secondary winding of their respective transformers resulting from the voltage induced in the respective secondary winding in response to the rise of current in the respective primary winding but to present low impedance to current flow in the secondary winding of their respective transformers resulting from the flyback voltage induced in said respective secondary winding in response to the fall of current in the respective primary winding; means for utilizing the flow of secondary current resulting from said flyback voltage in response to the fall of current in the respective primary winding; and a third winding on one of said transformers for also developing an early output signal in response to the rise of current in its primary winding.

7. A conditional steering gate as claimed in claim 4 characterized in that one of said transformers includes a third winding through which current flows in response to the voltage induced therein by the leading edge of said trigger pulse.

8. A high speed electronic relay comprising: first and second transformers each having at least a primary winding; a first diode; a second diode; a flip-flop circuit comprising first and second interconnected transistors each having base, emitter and collector electrodes; means for connecting said collector electrodes to a source of collector voltage; means for setting said flip flop in one or the other of its two stable states; means connecting said first diode in series in a first current path between the collector-to-emitter impedance of said first transistor and the primary winding of said first transformer; means connecting said second diode in series in a second current path between the collector-to-emitter impedance of said second transistor and said primary winding of said second transformer, thereby to reverse bias one of said diodes and to zero bias the other according to the state of the flip flop; means for applying a voltage pulse from an external source across said first and second current paths in parallel, said voltage pulse being of a polarity and magnitude to forward bias said zero-biased diode and to reduce but not overcome the reverse bias on the other of said diodes; and means for deriving an output signal from that one of said transformers whose primary winding is in series with that diode which is forward biased by said voltage pulse.

9. A high speed electronic relay comprising, first and second transformers each having at least a primary winding; a first diode; a second diode; a flip-flop circuit comprising first and second interconnected transistors each having input and output electrodes; means for applying a signal to the input electrodes on one side of said flip flop to set said flip flop in one of its two stable states; means for applying a signal to the input electrodes on the other side of said flip flop to reset said flip flop to the other of its two stable states; a first current path comprising the primary winding of said first transformer, said first diode and the impedance between the output electrodes of said first transistor; a second current path comprising the primary winding of said second transformer, said second diode and the impedance between the output electrodes of said second transistor, thereby to reverse bias one of said diodes and to zero bias the other according to the state of said flip flop; means for applying a voltage pulse across said first and second current paths in parallel, said voltage pulse being of a polarity and magnitude to forward bias said zero-biased diode and to reduce but not overcome the reverse bias on the other of said diodes; and means for deriving an output signal from that one of said transformers whose primary winding is included in the same current path with the diode which is forward biased by said voltage pulse.

References Cited in the file of this patent

UNITED STATES PATENTS

| | | |
|---|---|---|
| 2,634,052 | Block | Apr. 7, 1953 |
| 2,644,893 | Gehman | July 7, 1953 |
| 2,748,274 | Pearlman | May 29, 1956 |
| 2,809,303 | Collins | Oct. 8, 1957 |